UNITED STATES PATENT OFFICE.

JOHN T. MAXSON, OF ULYSSES, NEBRASKA.

IMPROVEMENT IN HOG-CHOLERA COMPOUNDS.

Specification forming part of Letters Patent No. 206,595, dated July 30, 1878; application filed May 29, 1878.

*To all whom it may concern:*

Be it known that I, JOHN T. MAXSON, of Ulysses, in the county of Butler, and in the State of Nebraska, have invented certain new and useful Improvements in Medical Compounds; and do hereby declare that the following is a full, clear, and exact description thereof.

The nature of my invention consists in a medical compound designed for the cure of hog-cholera, as will be hereinafter more fully set forth.

My medical compound is composed of the following ingredients, in about the following proportions, viz: One and a half pound red oxide of iron, one-half pound ferrocyanide of iron, one pound sodæ sulphis, four pounds ferri sulphas, one pound potassii chloras, two pounds sulphur, four ounces indigo, four ounces zinci sulphas, four ounces arsenious acid, all avoirdupois weight. These ingredients are thoroughly mixed and powdered to form a fine powder.

The quantities of the ingredients may be slightly changed without materially affecting the compound.

Half a pound of the compound described added to half a pint of salt and one pint of ashes, mixed dry, and then added to six gallons of thin bran-slop, will answer for thirty hogs of about one hundred pounds weight each, or for forty pigs.

This dose should be administered rather as a preventive than as a cure, and used from one to nine times, in accordance with the nature of the affection. To drench the animal when past eating, one or two tea-spoonfuls with a like quantity of salt and ashes in half a pint of warm water should be applied by holding the animal and forcing the medicine down the throat. Care should be taken to keep the hogs dry and warm and not to allow them to drink any cold water from for two to three days after taking the medicine.

To cure chicken-cholera, one tea-spoonful of the compound is used with a pint of corn-meal mixed with alum-water for about two dozen chickens.

Having thus fully described my invention, what I claim as new, and desire to secure by Letters Patent, is—

The within-described medical compound, consisting of red oxide of iron, ferrocyanide of iron, sodæ sulphis, ferri sulphas, potassii chloras, sulphur, indigo, zinci sulphas, and arsenious acid, combined substantially as and for the purposes herein set forth.

In testimony that I claim the foregoing I have hereunto set my hand this 15th day of April, 1878.

JOHN T. MAXSON.

Witnesses:
JAS. MASON,
JOHN T. MYERS.